United States Patent
Hara et al.

(10) Patent No.: US 8,027,392 B2
(45) Date of Patent: Sep. 27, 2011

(54) METHOD FOR TRANSMITTING INFORMATION INVOLVING ENHANCED ALLOCATION OF SPECTRAL RESOURCES

(75) Inventors: Yoshitaka Hara, Rennes Cedex (FR); Akinori Taira, Rennes Cedex (FR)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 1287 days.

(21) Appl. No.: 11/289,475

(22) Filed: Nov. 30, 2005

(65) Prior Publication Data
US 2006/0189335 A1  Aug. 24, 2006

(30) Foreign Application Priority Data
Dec. 24, 2004 (EP) .................................. 04293117

(51) Int. Cl.
  *H04K 1/10* (2006.01)
  *H04L 27/28* (2006.01)
(52) U.S. Cl. .................. 375/260; 375/296; 375/299
(58) Field of Classification Search .............. 375/259, 375/260; 455/436, 439; 370/310, 332
See application file for complete search history.

(56) References Cited

U.S. PATENT DOCUMENTS

| | | | |
|---|---|---|---|
| 5,960,354 A | 9/1999 | Einola | |
| 6,081,278 A * | 6/2000 | Chen | 345/473 |
| 6,606,485 B1 | 8/2003 | Chen et al. | |
| 7,411,931 B2 * | 8/2008 | Holma et al. | 370/335 |
| 2003/0091006 A1* | 5/2003 | Peltola | 370/332 |
| 2004/0171384 A1* | 9/2004 | Holma et al. | 455/436 |
| 2005/0101333 A1* | 5/2005 | Raith | 455/456.1 |
| 2006/0281412 A1* | 12/2006 | Skafidas et al. | 455/63.1 |

FOREIGN PATENT DOCUMENTS
EP  1 330 076 A2  7/2003

* cited by examiner

*Primary Examiner* — Chieh M Fan
*Assistant Examiner* — Qutbuddin Ghulamali
(74) *Attorney, Agent, or Firm* — Oblon, Spivak, McClelland, Maier & Neustadt, L.L.P.

(57) ABSTRACT

A method for transmitting information between at least two transceivers TRA and TRB linked together by a communication channel, said information being carried by means of at least one carrying signal Csg having an operating frequency, includes, according to the invention, a frequency selection step in the course of which said operating frequency is dynamically selected among frequencies comprised within at least a first and a second non-adjacent frequency intervals.

20 Claims, 5 Drawing Sheets

METHOD FOR TRANSMITTING INFORMATION INVOLVING ENHANCED ALLOCATION OF SPECTRAL RESOURCES

The present invention relates to a method for transmitting information between at least two transceivers linked together by a communication channel, said information being carried by means of at least one carrying signal having an operating frequency.

Such transmitting methods are currently used in wireless telecommunication systems, for example cellular systems in which a plurality of radio base stations are intended to communicate with another plurality of mobile terminals. Currently used cellular systems are for example of a so-called second generation, like GSM (standing for Global System for Mobiles) which operates in a [824.2-893.8 MHz] frequency band or of a third generation, like UMTS (standing for Universal Mobile Telecommunication System) which operates in a [1920-2170 MHz] frequency band.

It thus appears that future telecommunication systems of the fourth generation and other systems beyond the third generation will have to use even higher operating frequencies, since numerous lower bands of frequencies will already have been allocated to existing systems.

It should however be noted that, among other attractive aspects, a telecommunication system has to provide as wide a coverage area as possible in order to meet commercial success, since frequent access errors will act as a deterrent for most potential users of this system. A new generation telecommunication system also has to offer advantages which are not provided by the use of existing systems, among which advantages a high datarate appears first and foremost because of the enhanced quality and diversity of multimedia services an increase in datarate will allow. Unfortunately, raw physics give rise to a conflict between wide coverage and high datarate issues. Indeed, a radiowave featuring a low frequency is known for being better suited for supporting so-called NLOS (standing for Non-Line-Of-Sight) communications, because low frequencies offer higher diffraction and better propagation through hardened materials than high frequencies. A radio wave having a frequency beyond 5 GHz is for example unlikely to penetrate from outdoor to indoor. High frequencies, conversely, offer higher datarates and wider bandwidths than those offered by the generally still available low-frequency resources. The latter fact makes the use of high carrying frequencies unavoidable, though such a use will induce a considerable risk for consumers to be dissatisfied with the resulting coverage area.

No solution to the above-described conflict has so far been disclosed in the known art. Alternative solutions consist in using separate at least two telecommunication systems offering either a wide coverage area or a wide bandwidth and a high data rate, and offering a user an alternative use of these two telecommunication systems depending on communication requirements specific to said user, transitions between systems being performed according to well-known network handover techniques. Such an alternative raises other problems related to toll collection, delay and control complexity and should thus be avoided in the future.

The invention aims at solving the aforementioned problems, by providing a method for transmitting information which can be used in a single telecommunication system, and offers a wide coverage area as well as a high transmission datarate while requiring the use of comparatively small low-frequency bandwidths with respect to the bandwidths already allocated to existing second and third generation telecommunication systems.

Indeed, a method according to the opening paragraph is characterized according to the invention in that it includes a frequency selection step in the course of which the operating frequency is dynamically selected among frequencies comprised within at least a first and a second non-adjacent frequency intervals.

The invention offers to any user of the telecommunication system an adaptative choice of frequencies available in one or the other of two separate frequency intervals, the first of which including for example lower frequencies than the second interval, the frequencies included in said first interval being then especially well-suited for carrying information in NLOS communication conditions, the frequencies included in said second interval being in turn especially well-suited for carrying information during high-datarate communications. The dynamic selection provided by the invention will enable to restrict the use of the frequencies included in the first interval, which are in shorter supply for reasons described above, to specific situations where such a use is unavoidable, the use of frequencies included in the second interval being otherwise preferred.

It should also be noted here that the dynamic selection provided by the invention is done without having to perform any networking handover, i.e. without affecting any network identification allocated to the first and second transceivers, for example IP (standing for Internet Protocol) addresses. Any frequency switching performed according to the invention will thus be executed locally, within the transceivers themselves, which ensures that said switching will be done very quickly.

According to a possible embodiment of the invention, the first frequency interval will be separated from the second frequency interval by a separation interval having a width, called separation width, chosen such that a ratio between the separation width and the width of the first frequency interval exceeds a predetermined threshold.

The predetermined threshold will be computed in order to ensure that the width of the separation interval is sufficient for guaranteeing that propagation and diffraction characteristics differ from one frequency interval to another.

It should be noted here that the invention may be also be used in situations were propagation and diffraction characteristics do not differ significantly from one frequency interval to another.

As explained above, the use of lower-value frequencies should be restricted to specific situations, since such frequencies are in short supply.

According to a first advantageous embodiment of the invention, if the frequencies included in the second frequency interval are higher than those included in the first frequency interval, an operating frequency selected from the first frequency interval will be allocated in the course of the frequency selection step to a communication identified as requiring a predefined high quality of service.

This first advantageous embodiment of the invention is a simple and cost-effective way of automatically and suitably dealing with privileged users having subscribed to a high-quality service or with users of specific applications which require allocation of comparatively low frequencies selected from the first frequency interval.

In a second advantageous embodiment of the invention, which may be used alternatively or cumulatively with the first advantageous embodiment, a method as described above and including a communication conditions evaluating step in the course of which at least one parameter representative of the communication conditions affecting the communication channel is evaluated, method characterized in that, if the frequencies included in the second frequency interval are higher than those included in the first frequency interval, an operating frequency selected from the first frequency interval will be allocated in the course of the frequency selection step to a communication to be carried out through a channel for which the evaluated parameter does not exceed a predefined threshold.

This second advantageous embodiment of the invention is a simple and cost-effective way of automatically and suitably dealing with bad or deteriorating communication conditions which will require allocation of comparatively low frequencies selected from the first frequency interval. The parameter representative of the communication conditions may be evaluated by any given transceiver, e.g. a mobile terminal, on the basis of pilot signals received from another transceiver, e.g. a radio base station, for example by computing an attenuation factor induced by the communication channel established between said transceivers.

In a third advantageous embodiment of the invention, which may be used alternatively or cumulatively with the first and/or second advantageous embodiments, a method as described above may include a mobility evaluating step in the course of which at least one speed value representative of a mobility of one of the transceivers is computed, said method then being characterized in that, if the frequencies included in the second frequency interval are higher than those included in the first frequency interval, an operating frequency selected from the first frequency interval will be allocated in the course of the frequency selection step if the computed speed value exceeds a predefined threshold.

This third advantageous embodiment of the invention is a simple and cost-effective way of automatically and suitably dealing with movements of the mobile user which will require allocation of comparatively low frequencies selected from the first frequency interval. The speed value may be computed by quantifying a Doppler effect affecting any given mobile terminal, or, if the telecommunication system in which the invention is embodied is a cellular system, by measuring a handover frequency, i.e. the frequency at which said given mobile terminal switches from one active base station to another.

In a fourth advantageous embodiment of the invention, which may be used alternatively or cumulatively with the first, second and/or third advantageous embodiments, a same transmission scheme is used for transmitting signals at operating frequencies selected from the first and second frequency intervals.

This fourth embodiment of the invention requires a single baseband unit in each transceiver making use of the invention, the only hardware required in addition to that currently included in state-of-the-art transceivers consisting in as many additional frequency shifters as there will be separate frequency intervals available, a single signal combiner being then also needed for performing a mixing of the signals possibly issued by said frequency shifters before transmission by means of a transmitting antenna.

According to one of its many possible applications, a method according to the invention and intended to be used in a cellular telecommunication system including at least two neighbouring radio base stations and at least one mobile terminal and in which the frequencies included in the second frequency interval are higher than those included in the first frequency interval, includes a channel monitoring step to be carried out by the mobile terminal and in the course of which said mobile terminal analyses if frequencies included in the first and second frequency intervals are suitable for being selected as operating frequencies for communicating with its current active base station, method further including a base station switching step in the course of which the mobile terminal will require its active base station to be changed if no frequency included in the second frequency interval has been found suitable during the channel monitoring step.

In this application of the invention, a handover should be triggered by a mobile terminal if a communication with its active base station is no longer possible through a high-frequency channel, even if a communication through a low-frequency channel were still possible, which would otherwise be the most logical choice, at least according to standard handover practice. This particular measure will help sparing low-frequency resources, which are in shorter supply than high frequency resources as already explained hereinbefore.

According to another possible application of the invention where a method as described above is intended to be used in a cellular telecommunication system including at least one radio base station and at least two mobile terminals, said method advantageously includes:

a channel monitoring step to be carried out by the mobile terminals and in the course of which each mobile terminal analyses if frequencies included in the first and second frequency intervals are suitable for being selected as operating frequencies for communicating with its current active base station;

a channel condition reporting step in the course of which each mobile terminal reports to the base station the findings of the channel monitoring step it has performed; and a frequency allocation step to be carried out by the radio base station, in the course of which one of the available frequencies will be allocated to each mobile terminal for enabling said terminal to communicate with the radio base station.

This application of the invention enabes central management of the radio resources of the cellular telecommunication system, and thus favours an optimal use of the low-frequency resources. The allocation may be performed on the basis of multiple criteria relating to each mobile terminal, such as channel communication conditions, quality of service, and mobility.

According to a variant of the above-described method, in which the frequencies included in the second frequency interval are higher than those included in the first frequency interval, the allocation carried out in the course of the allocation step is performed by prioritarily allocating frequencies selected from the second frequency interval.

This allocation scheme operates on a basic principle which is quite easy to follow, and may thus be carried out at a relatively low cost in terms of processing power and computing time.

The channel condition reporting and the frequency allocation step are to be executed at least once at the beginning of each communication to be established between a given mobile terminal and the radio base station, and will preferably be repeatedly executed during a same communication established between a given mobile terminal and the radio base station, thus allowing to perform intra-cell frequency handover without having to apply any changes to parameters relevant to protocol layers higher than the PHY and MAC layers well-known to those skilled in the art, which in turns allows quick frequency adaptation and thus favours communication quality.

According to yet another possible embodiment of the invention, which may be implemented alternatively or cumulatively with any of the other embodiments disclosed hereinbefore, a method as described above further includes an operating frequency switching step in the course of which the operating frequency is to be switched from a formerly selected frequency to a newly selected frequency, such a switching being performed gradually by simultaneously attenuating progressively the signal transmitted at the formerly selected frequency and amplifying progressively the signal transmitted at the newly selected frequency.

In this other possible embodiment of the invention, the switch from one frequency to the other is gradual, which should prevent spike generation and information loss, since no signal will suddenly appear or be cut off, which discontinuities could produce voltage peaks in parasitic inductances included within the hardware mentioned above.

According to a very specific embodiment of the invention, the second frequency interval includes frequencies having values corresponding to sub-millimeter wavelengths.

Though the use of sub-millimeter wavelengths in telecommunication systems has been envisioned before, because of the very wide bandwidth and hence very high datarates such wavelengths offer, their vulnerability to NLOS phenomena has prevented their actual use in known telecommunication systems. Since the invention enables to compound this vulnerability with a use of lower frequencies restricted to specific situations were the sub-millimeter wavelength communication link will be endangered, the invention allows to reach the datarate performances offered by such links without risking a total communication loss due to temporary NLOS communication conditions.

Furthermore, though the first or second frequency intervals may feature identical respective first and second bandwidths, it will often be more advantageous to use different first and second bandwidths and particularly to allocate a higher bandwidth to the higher frequencies, which will thus be able to support even higher datarates than those supported by the lower frequencies.

According to one of its hardware-related embodiments, the invention also concerns a telecommunication system including at least two transceivers intended to be linked together by a communication channel through which information is to be carried by means of at least one carrying signal having an operating frequency, system including frequency selection means for dynamically selecting said operating frequency among frequencies comprised within at least a first and a second non-adjacent frequency intervals.

According to a variant of this hardware-related embodiment, the invention also concerns a telecommunication system comprising at least one radio base station and at least two mobile terminals, system further including:

channel monitoring included in each mobile terminal for enabling said mobile terminal to analyse if frequencies included in the first and second frequency intervals are suitable for being selected as operating frequencies for communicating with its current active base station;

channel condition reporting means included in each mobile terminal for enabling said mobile terminal to report to the base station the findings of the analysis performed by the channel monitoring means; and frequency allocation means included in the radio base station for allocating one of the available frequencies to each mobile terminal for communicating with the radio base station.

According to another one of its hardware-related embodiments, the invention further concerns a telecommunication device intended to be linked to a transceiver by a communication channel through which information is to be carried by means of at least one carrying signal having an operating frequency, device including frequency selection means for dynamically selecting said operating frequency among frequencies comprised within at least a first and a second non-adjacent frequency intervals.

According to a variant of this other hardware-related embodiment, the invention also concerns a telecommunication device intended to be used in a cellular telecommunication system comprising at least one radio base station, device further including:

channel monitoring means for enabling said device to analyse if frequencies included in the first and second frequency intervals are suitable for being selected as operating frequencies for communicating with its current active base station; and channel condition reporting means for enabling said device to report to the base station the findings of the analysis performed by the channel monitoring means;

device in which the frequency selection means are adapted to be controlled by a frequency selection signal issued by the base station in answer to a report sent by the device.

The characteristics of the invention mentioned above, as well as others, will emerge more clearly from a reading of the following description given in relation to the accompanying figures, amongst which:

Figure 1:
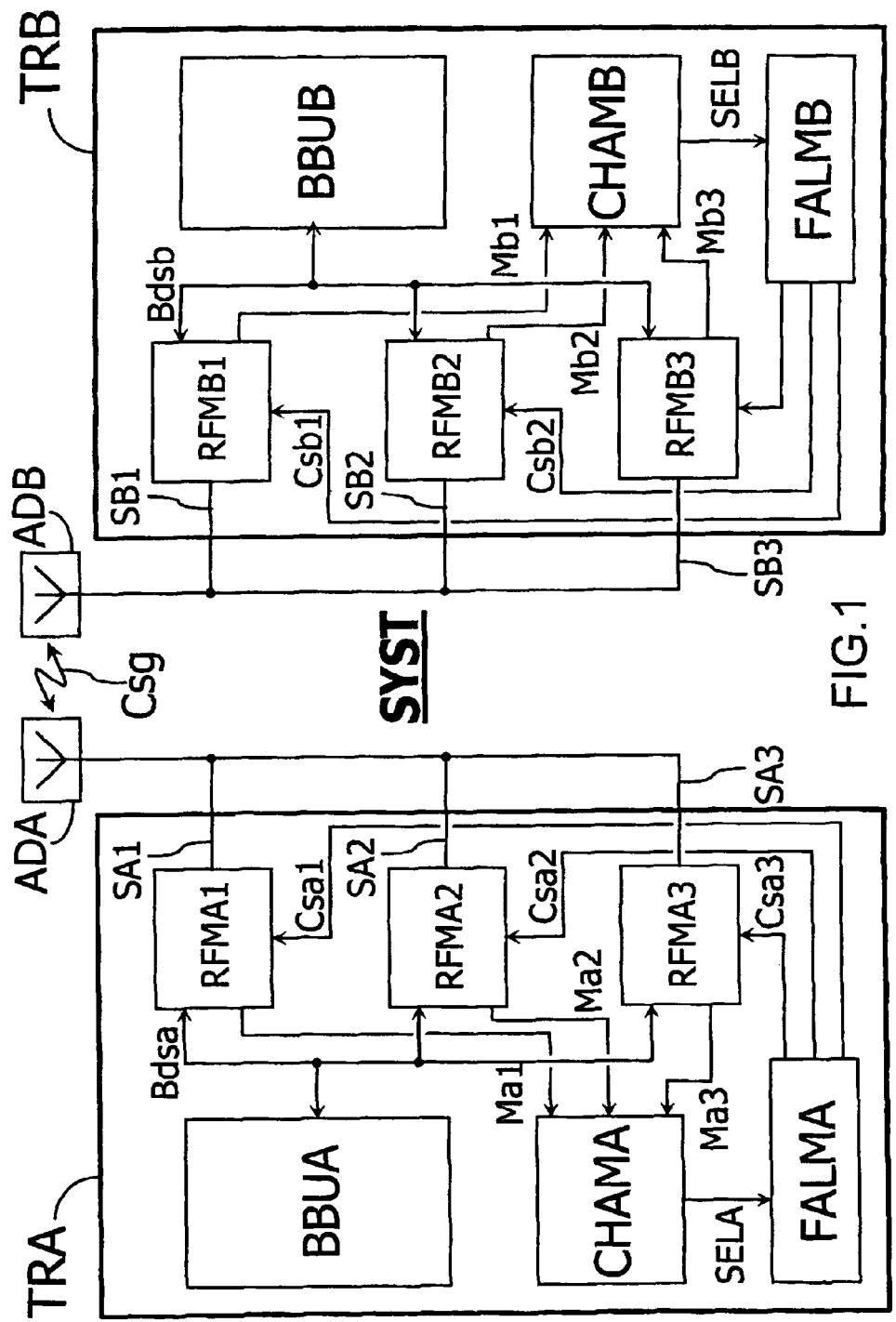
FIG. 1 is a schematic diagram depicting a telecommunication system in which a method according to the invention will be advantageously used for transmitting information.

FIG. 1 diagrammatically shows a wireless telecommunication system SYST including at least two transceivers TRA and TRB intended to be linked together by a communication channel through which information is to be carried by means of at least one carrying signal Csg having an operating frequency. In this embodiment of the invention, each transceiver TRA and TRB includes frequency selection means (CHAMA, FALMA, RFMA1, RFMA2, RFMA3) and (CHAMB, FALMB, RFMB1, RFMB2, RFMB3) for dynamically selecting the operating frequency among frequencies comprised within first, second and third non-adjacent frequency intervals respectively centered on first, second and third reference frequencies f1, f2 and f3 as will be shown hereinafter.

Each transceiver TRA and TRB includes in this example a baseband unit BBUA and BBUB intended to deliver or receive modulated and encoded baseband signals Bdsa and Bdsb according to a given transmission scheme which will have been defined before deployment of the telecommunication system. Such a scheme may for example be the CDMA (standing for Code Division Multiple Access) or the TDMA (standing for Time Division Multiple Access) scheme. The baseband units BBUA and BBUB will thus advantageously include all the hardware needed for encoding, decoding, modulating and demodulating the baseband signals Bdsa and Bdsb according to the chosen transmission scheme.

Each transceiver TRA and TRB includes in this example three transmitting and receiving radiofrequency modules, called RF modules and referenced (RFMA1, RFMA2, RFMA3) and (RFMB1, RFMB2, RFMB3). Each of these modules RFMAi or RFMBi (for i=1 to 3) is intended to apply, when activated by a control signal Csai, a frequency shift to the baseband signal Bdsa or Bdsb in order to produce a signal SAi or SBi roughly centered on one of the first, second or third frequencies f1, f2 of f3 and intended to be transmitted by an antenna device ADA or ADB, or, conversely, to apply a frequency downshift to the signal SAi or SBi received by said antenna device ADA and ADB in order to produce a baseband signal Bdsa or Bdsb.

This embodiment of the invention offers an adaptative choice of frequencies available in one of three separate frequency intervals, the first of which including for example lower frequencies than the second and third intervals, the frequencies included in said first interval being then especially well-suited for carrying information in Non-Line-Of-Sight (NLOS) communication conditions, the frequencies included in the second and even more particularly in the third interval being in turn especially well-suited for carrying information during high-datarate communications. A dynamic selection performed by the frequency selection means (CHAMA, FALMA, RFMA1, RFMA2, RFMA3) and (CHAMB, FALMB, RFMB1, RFMB2, RFMB3) enables to restrict the use of the frequencies included in the first interval, which are in shorter supply for reasons described above, to specific situations where such a use is unavoidable, the use of frequencies included in the second and third intervals being otherwise preferred.

In this embodiment of the invention, each transceiver TRA and TRB includes channel analysing means CHAMA and CHAMB for analysing the communication conditions to which each relevant transmitter is to be submitted, and providing a selection signal SELA and SELB to frequency allocation means FALMA and FALMB who are to translate the contents of the selection signal SELA and SELB into corresponding vales of control signals (Csa1, Csa2, Csa3) and (Csb1, Csb2, Csb3) in order for the operating frequency to be suitably tuned.

In particular, when the channel analysing means CHAMA and CHAMB will notice that the communication to be supported by the corresponding terminal requires a predefined high quality of service produce, the contents of the selection signal SELA and SELB produced by said channel analysing means CHAMA and CHAMB will order an operating frequency to be selected from the first frequency interval. This is a simple and cost-effective way of automatically and suitably dealing with privileged users having subscribed to a high-quality service or with users of specific applications which require allocation of comparatively low frequencies selected from the first frequency interval.

In this embodiment of the invention, the channel analysing means CHAMA and CHAMB also include means for evaluating at least one parameter (Ma1, Ma2, Ma3) and (Mb1, Mb2, Mb3) representative of the communication conditions affecting the communication channel, for example a power value measured in relation with pilot signals received by transmitter TRA or TRB on the first, second and third reference frequencies f1, f2, f3 corresponding to the first, second and third frequency intervals. When the channel analysing means CHAMA and CHAMB will notice that the evaluated parameter falls below a predefined threshold for a given communication channel, i.e. when the communication conditions are too bad for establishing or maintaining a communication through this channel, the contents of the selection signal SELA and SELB produced by the channel analysing means CHAMA and CHAMB will order to discard the frequency interval related to this communication channel and to select an operating frequency from the immediately lower frequency interval. This is a simple and cost-effective way of automatically and suitably dealing with bad or deteriorating communication conditions which will require allocation of comparatively low frequencies.

As will be explained hereinafter, the channel analysing means CHAMA and CHAMB may also include mobility evaluating means for computing at least one speed value representative of a mobility of at least the transceiver TRA or TRB including said means, for example by analysing the frequency at which said transceiver TRA or TRB transmits handover requests if it is a mobile terminal communicating with a cellular network, the mobility evaluating means included in transceivers TRA and TRB being optionally able to compute speed values representative of the mobility of other transceivers, e.g. TRB or TRA, by analysing the Doppler frequency linked to said other transceivers. When the channel analysing means CHAMA and CHAMB will notice that the computed speed value exceeds a first predefined threshold indicative of high mobility, the contents of the selection signal SELA and SELB produced by the channel analysing means CHAMA and CHAMB will order to select an operating frequency from the second frequency interval, and, if absolutely necessary, i.e. if the computed speed value is so high as to exceed a second threshold value higher than the first one, from the first frequency interval.

It should also be noted here that, since a same transmission scheme is used in this particular embodiment for transmitting signals at operating frequencies selected from the first, second and third frequency intervals, a single baseband unit is needed in each transceiver, the only hardware required in addition to that currently included in state-of-the-art transceivers consisting in frequency selection means (CHAMA, FALMA, RFMA1, RFMA2, RFMA3) and (CHAMB, FALMB, RFMB1, RFMB2, RFMB3).

Figure 2:
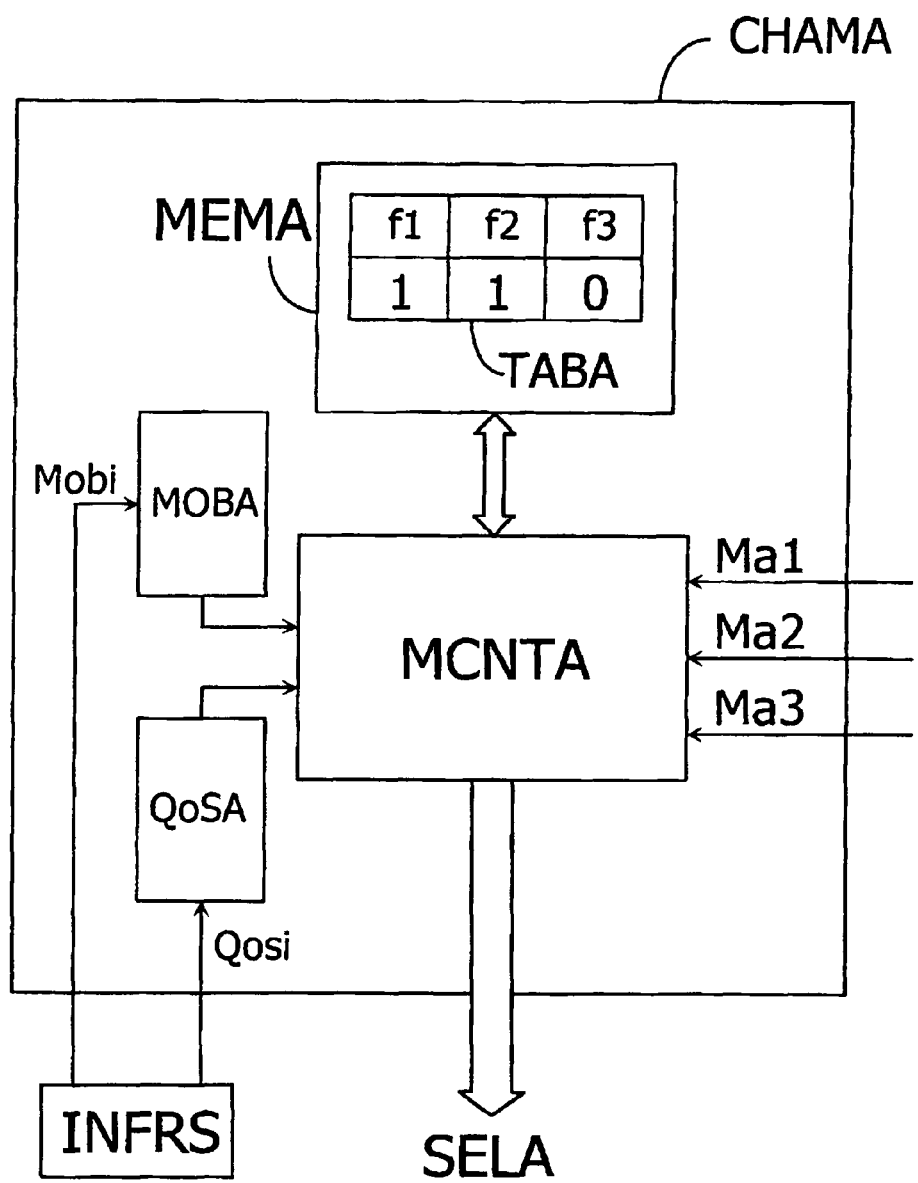
FIG. 2 is a schematic diagram showing channel analysing means used for evaluating communication conditions in such a telecommunication system.

FIG. 2 diagrammatically depicts channel analysing means CHAMA intended to produce a selection signal SELA according to the method described above. These channel analysing means CHAMA include a microcontroller MCNTA intended to receive in real-time series of values of parameter (Ma1, Ma2, Ma3) and (Mb1, Mb2, Mb3) representative of the communication conditions affecting the communication channel, for example a power value measured in relation with pilot signals received on the first, second and third reference frequencies f1, f2, f3 corresponding to the first, second and third frequency intervals. The microcontroller thus regularly updates a table TABA stored in memory means MEMA, and indicates with a simple binary value in relation with each reference frequency f1, f2 and f3 if an operating frequency selected from the corresponding frequency interval would be able to support a communication given the evaluated communication conditions for such a channel. In this example, the communication conditions are good enough for supporting communications having operating frequencies chosen in the first and second intervals, the third frequency interval being currently not suitable.

In this embodiment of the invention, the channel analysing means CHAMA further include a mobility module MOBA and a quality of service module QoSA respectively intended to receive mobily information Mobi and quality of service information QoSi, for example from an infrastructure INFRS of the system, but possibly also from other parts of the transceiver within which the channel analysing means CHAMA are embedded. As explained above, the mobily information may consist in a quantification of a Doppler effect affecting any given mobile terminal, or, if the telecommunication system in which the invention is embodied is a cellular system, of a handover frequency, i.e. the frequency at which said given mobile terminal switches from one active base station to another, which measure may be produced by a mobile terminal or by the infrastructure INFRS. The quality of service information QoSi may indicate if the nature of data to be transmitted by means of the communication for which the operating frequency is sought requires a high or a low datarate, which would for example respectively be the case for transmission of video or of voice signals. Quality of service information QoSi may also consist in system parameters such as requirements of delay, bit rate and bit error rate.

The microcontroller MCNTA will thus process in real-time its above-described input signals Ma1, Ma2, Ma3 and the signals delivered by the table TABA and the mobility module MOBA and the quality of service module QoSA in order to generate the selection signal SELA considered suitable according to the method described above.

Figure 3:
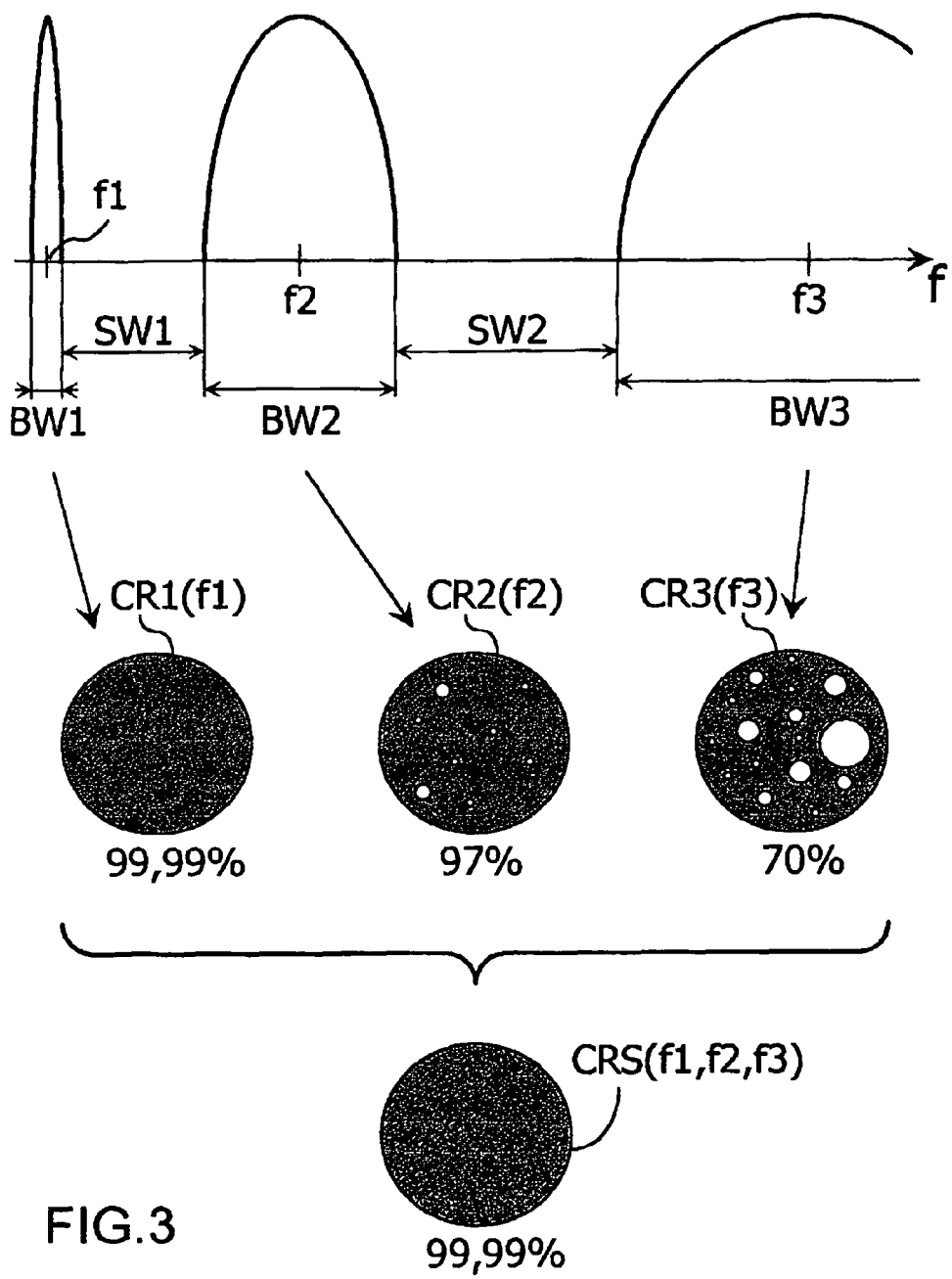
FIG. 3 is a diagram showing frequency intervals among which operating frequencies of a telecommunication system according to the invention may be chosen, and associated coverage ratios.

FIG. 3 depicts a spectral distribution of a first, a second and a third non-adjacent frequency intervals among which the operating frequency of the telecommunication system will be dynamically selected according to the invention. As already explained, these frequency intervals are centered on first, second and third reference frequencies f1, f2, f3, for example respectively 800 MHz, 3.5 GHz and 19 GHz. The first, a second and a third frequency interval have respective bandwidths BW1, BW2 and BW3 respectively 6 MHz, 50 MHz and 100 MHz in this example. Each given frequency interval is separated from the next frequency interval by a separation interval having a width SWj (for j=1 or 2), called separation width This separation width SWj (for j=1 or 2) may be chosen such that a ratio between the separation width SWj and the width BWj of the given frequency interval exceeds a predetermined threshold, which may then in turn be computed in such a way that, for example, the resulting width of each separation interval SW1 and SW2 is sufficient for guaranteeing that propagation and diffraction characteristics differ from one frequency interval to another. It should be noted here, however, that the invention may be also be used in embodiments were propagation and diffraction characteristics do not differ significantly from one frequency interval to another, though each given frequency interval will then still be separated from the next frequency interval by a separation interval having a width SWj (for j=1 or 2) as depicted here.

The present Figure also depicts in dashed lines an alternative embodiment of the invention corresponding, in the example shown here, to a situation were it has not been possible to allocate a single and continuous frequency interval for constituting the third frequency interval, e.g. because some small sub-bands of the relevant frequency interval were already allocated to third parties. In such a case, according to a variant of the invention, the third frequency interval is formed by an assembly of three non-adjacent frequency sub-intervals SI30, SI3 and SI32 respectively centered on frequencies f30, f3 and f32. In this variant of the invention, there will be no separation constraint regarding the separations between sub-intervals SI30, SI3 and SI32, since the propagation and diffraction characteristics should not differ significantly within a same frequency interval.

In other variants of the invention, the second frequency interval and even the first frequency interval may have to be partitioned in the same way the third interval is partitioned in the variant described hereinbefore.

The advantages of the invention are made clear on the basis of coverage diagrams showing that a telecommunication system using frequencies included in the first frequency interval would have a coverage ratio CR1(f1) equal to 99.99%, whereas a telecommunication system using frequencies included in the second frequency interval would have a coverage ratio CR2(f2) equal to 97% and a telecommunication system using frequencies included in the third frequency interval would have a coverage ratio CR3(f3) equal to 70%. The latter observation has to this day prevented any practical use of sub-millimeter wavelengths, though such wavelengths offer very high datarates.

As can be observed, the coverage ratio CRS(f1,f2,f3) of a telecommunication system according to the invention, in which the operating frequency is chosen alternatively and dynamically from the first, second and a third frequency intervals is equal to 99.99%, which is equivalent to say that it offers as good a coverage as if it were using a single frequency interval centered on f1 and having a bandwidth equal to BW1+BW2+BW3, which thus solves the problem caused by any previous allocation of comparatively low frequencies to already deployed second and third generation telecommunication systems.

Figure 4:
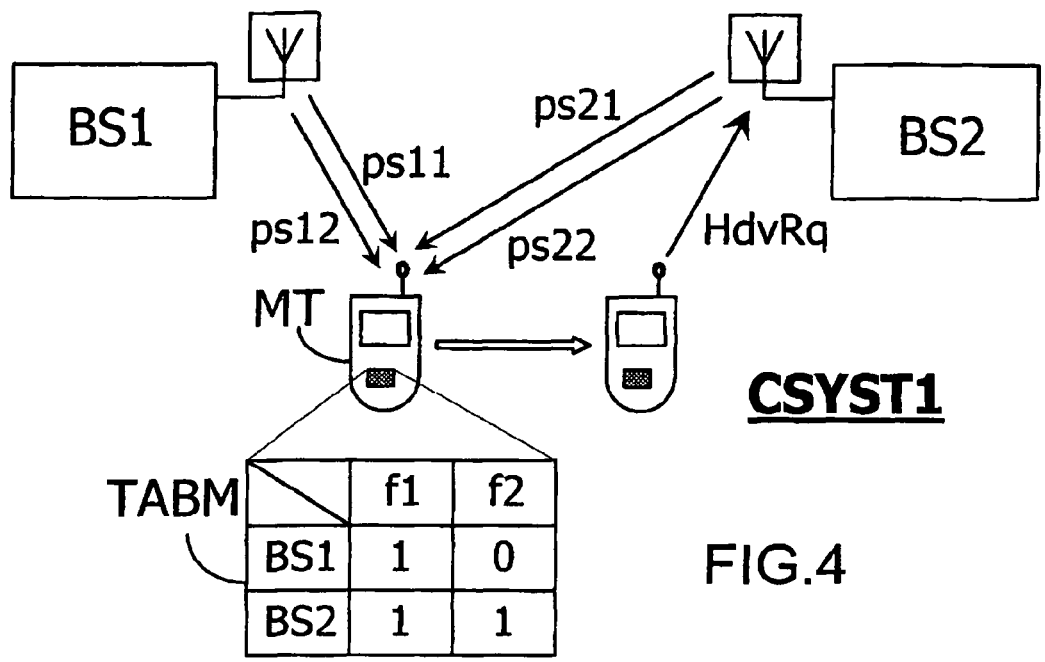
FIG. 4 shows a particular embodiment of the invention in a cellular telecommunication system.

FIG. 4 depicts a specific embodiment of the invention in a cellular telecommunication system CSYST1 including at least two neighbouring radio base stations BS1 and BS2 and at least one mobile terminal MT including channel monitoring means for analysing, in the course of a cyclic channel monitoring step, if frequencies f1 and f2 included in the first and second frequency intervals are suitable for being selected as operating frequencies for said mobile terminal MT to communicate with its current active base station BS1. The channel monitoring means also are able to analyse in the course of the cyclic channel monitoring step if frequencies f1 and f2 included in the first and second frequency intervals are suitable for being selected as operating frequencies for said mobile terminal MT to communicate with a neighbouring base station BS2. To this end, the mobile terminal includes measuring means for measuring power levels corresponding to pilot signals ps11, ps12 and ps21, ps22 respectively transmitted by base stations BS1 and BS2 over frequencies f1 and f2. The mobile terminal thus regularly updates a table TABM indicating which frequencies are available for communicating with which base station. In this embodiment of the invention, the mobile terminal MT will require its active base station to be changed if, as is the case in this example, no frequency f2 included in the second frequency interval has been found suitable by the channel monitoring means.

In this application of the invention, the mobile terminal MT will trigger an active base station switch by transmitting a handover request HdvRq, because a communication with its active base station is no longer possible through a high-frequency channel, though a communication through a low-frequency channel is still possible, which would otherwise be the most logical choice, at least according to standard handover practice. This particular measure will help sparing low-frequency resources, which are in shorter supply than high frequency resources as already explained hereinbefore. The mobile terminal MT may identify in its handover request HdvRq the base station to which a connection seems the most advantageous, on the basis of the contents of the table TABM, which is in this simple example base station BS2, but it should be noted that in an actually deployed telecommunication system including a network of hundreds of base stations, each mobile terminal MT may monitor up to ten or twenty different communication channels in order to identify the best possible wireless link to the network.

Figure 5:
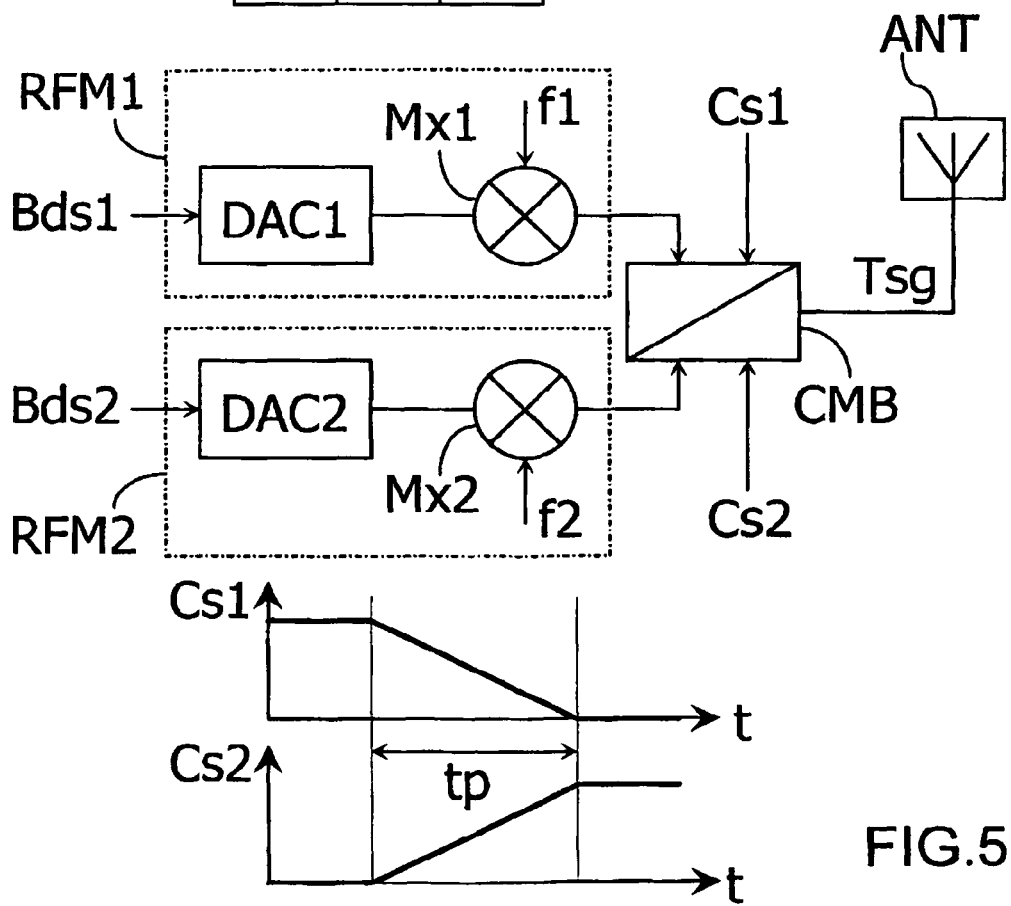
FIG. 5 is a schematic diagram showing a possible embodiment of a transmitting stage included in a mobile terminal to be used in such a cellular telecommunication system.

FIG. 5 shows two radiofrequency modules RFM1 and RFM2 according to a particular embodiment of the invention. Each of these modules RFMi (for i=1 or 2) includes a digital-to-analog converter DACi intended to convert a digital baseband signal Bdsi into an analog signal. The digital baseband signals Bds1 and Bds2 may be identical, but they may also be different from each other. Each module RFMi (for i=1 or 2) further includes a mixer Mxi, for example a Gilbert cell, intended to receive a data signal outputted by the digital-to-analog converter DACi and a signal having a reference frequency fi. As already known in the art, the mixer Mxi will then produce an output signal having a frequency equal to a difference between the reference frequency fi and the frequency of the data signal outputted by the digital-to-analog converter DACi. The transceiver including the radiofrequency modules RFM1 and RFM2 further includes in this embodiment of the invention a signal combiner CMB for combining signals outputted by both radiofrequency modules RFM1 and RFM2 into a single signal Tsg to be transmitted by an antenna ANT. To this end, each the signal outputted by a radiofrequency module RFMi is weighted by an associated control signal Csi, for example by means of another Gilbert multiplying cell, before being summed with the other weighted signal.

As can be observed here, in this particular embodiment of the invention, the control signals Cs1 and Cs2 respectively decrease and increase continuously during a transition period tp, during which an operating frequency switching step is carried out in order to switch the operating frequency from a frequency f1 formerly selected within the first frequency interval to a frequency f2 newly selected from the second frequency interval. The frequency switching is thus performed gradually by simultaneously attenuating progressively the signal transmitted at the formerly selected frequency f1 and amplifying progressively the signal transmitted at the newly selected frequency f2.

In this embodiment of the invention, the gradual switch from one frequency to the other should prevent spike generation and information loss, since no signal will suddenly appear or be cut off, which discontinuities could produce voltage peaks in parasitic inductances included within the hardware mentioned above.

It should be noted here that, in other situations, both control signals Cs1 and Cs2 may be simultaneously set at a high level so that both signals outputted by both radiofrequency modules RFM1 and RFM2 are used for constituting the signal Tsg to be transmitted by an antenna ANT, for example with the purpose of enhancing the quality of the communication by introducing redundancy.

Figure 6:
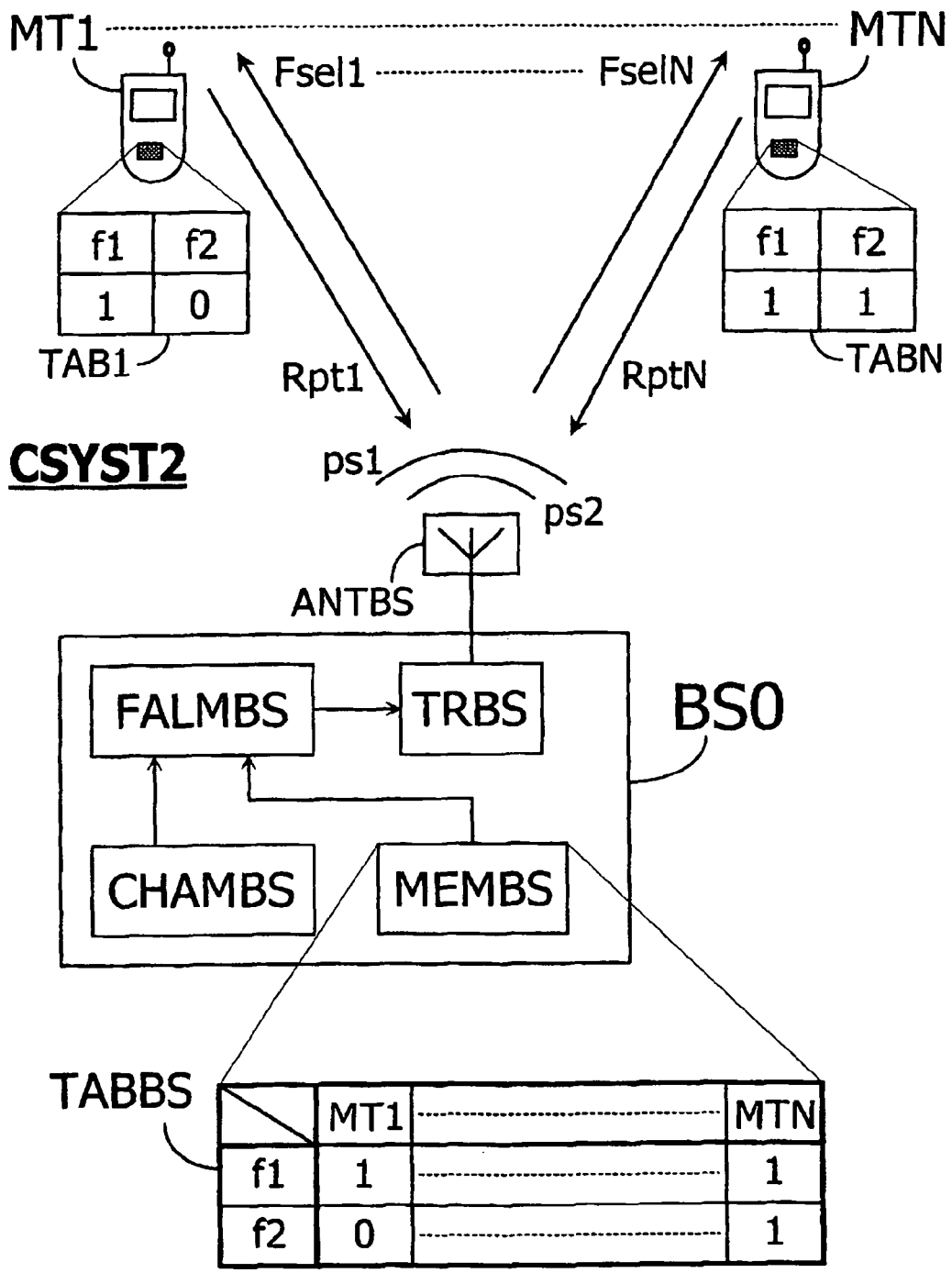
FIG. 6 shows another embodiment of the invention in a cellular telecommunication system.

FIG. 6 depicts another embodiment of the invention in a cellular telecommunication system CSYST2 including at least one radio base station BS0 and an integer number N of mobile terminals MT1 . . . MTN. In this embodiment of the invention, the base station Bs0 is intended to regularly broadcast pilot signals ps1, ps2 having frequencies f1 and f2 included in the first and second frequency intervals. Each mobile terminal MTk (for k=1 to N) includes channel monitoring means for carrying out at least one channel monitoring step in the course of which said mobile terminal MTk analyses if said frequencies f1 and f2 are suitable for being selected as operating frequencies for communicating with its current active base station. The findings of this channel monitoring step are memorized in a table TABk stored in memory means included in each terminal MTk. In the embodiment depicted here, each terminal MTk (for k=1 to N) further includes unshown channel condition reporting means, e.g. a baseband unit coupled with at least one radiofrequency module and at least one transmitting antenna, for carrying out at least one channel condition reporting step in the course of which said mobile terminal MTk reports to the base station BS0 the findings of the channel monitoring step it has performed by transmitting at least one report signal Rptk.

In this embodiment of the invention, the radio base station BS0 is similar to one of the transceivers described in FIG. 1 and includes frequency allocation means FALMBS for carrying out at least one frequency allocation step in the course of which one of the available frequencies will be allocated to each mobile terminal MTk (for k=1 to N) for enabling said terminal MTk to communicate with the radio base station BS0, said allocation being performed, for example, by prioritarily allocating frequencies selected from the second frequency interval in accordance with the contents of a table TABBS stored in memory means included in base station BS0, but also in accordance with other information provided to the frequency allocation means FALMBS by channel analysing means CHAMBS, which means may in some embodiments include the table TABBS as already explained with respect to FIGS. 1 and 2. The frequency allocation means FALMBS thus deliver via a transmitting part TRBS and an antenna ANTBS a frequency selection signal Fselk to each mobile terminal MTh (for k=1 to N) ordering said terminal MTh to use the frequency represented by this selection signal Fselk for communicating with base station BS0.

The channel condition reporting step and the frequency allocation step are to be executed at least once at the beginning of each communication to be established between a given mobile terminal MTh (for k=1 to N) and the radio base station BS0, and will preferably be repeatedly executed during a same communication established between said mobile terminal MTk and the radio base station BS0.

The base station BS0 may thus send to said terminal MTh a frequency selection signal Fselk ordering said terminal to change its operating frequency even in the course of an already established communication.

The embodiments of the invention shown in FIGS. 4 and 6 respectively allow to perform inter-cell and intra-cell frequency handovers without having to apply any changes to parameters relevant to protocol layers higher than the PHY and MAC layers well-known to those skilled in the art, and may thus be executed without any significant delay and without requiring any increase in protocol traffic. Most particularly, the dynamic frequency selections provided by these embodiments of the invention are done without having to perform any networking handover, i.e. without affecting any network identification allocated to the relevant base station and mobile terminal, for example IP (standing for Internet Protocol) addresses. Any frequency switching performed according to these embodiments of the invention will thus be executed locally, within the relevant base station and mobile terminal themselves, which ensures that said frequency switching will be done very quickly and thus favours communication quality.

The invention claimed is:

1. A method for transmitting information between at least two transceivers linked together by a communication channel, the information being carried by means of at least one carrying signal having an operating frequency, the method comprising:
   dynamically selecting the operating frequency among frequencies comprised within at least two non-adjacent frequency intervals,
   wherein the same transmission scheme is used for transmitting signals at operating frequencies selected from the frequency intervals, the method being intended to be used in a cellular telecommunication system including at least one radio base station and at least one mobile terminal, the method further including execution by the at least one mobile terminal, of reporting of conditions of the two frequency intervals by transmitting at least one report signal, wherein in a cellular telecommunication system including at least one radio base station and at least two mobile terminals, the method further comprising:

channel monitoring to be carried out by the mobile terminals and in the course of which each mobile terminal analyzes if frequencies included in first and second frequency intervals are suitable for being selected as operating frequencies for communicating with its current active base station;

channel condition reporting in the course of which each mobile terminal reports to the base station the findings of the channel monitoring it has performed;

frequency allocating to be carried out by the radio base station, in the course of which one of the frequencies will be allocated to each mobile terminal for enabling said terminal to communicate with the radio base station; and operating frequency switching in the course of which the operating frequency is to be switched from a formerly selected frequency to a newly selected frequency, such a switching being performed gradually by simultaneously attenuating progressively the signal transmitted at the formerly selected frequency and amplifying progressively the signal transmitted at the newly selected frequency.

2. The method as claimed in claim 1, further comprising: separating the first frequency interval from the second frequency interval by a separation interval having a width, called separation width, chosen such that a ratio between the separation width and the width of the first frequency interval exceeds a predetermined threshold.

3. The method as claimed in claim 1, further comprising: Allocating, if the frequencies included in the second frequency interval are higher than those included in the first frequency interval, an operating frequency selected from the first frequency interval in the course of the frequency selection to a communication identified as requiring a predefined high quality of service.

4. The method as claimed in claim 1, further comprising: communication conditions evaluating in the course of which at least one parameter representative of the communication conditions affecting the communication channel is evaluated, wherein if the frequencies included in the second frequency interval are higher than those included in the first frequency interval, an operating frequency selected from the first frequency interval will be allocated in the course of the frequency selection to a communication to be carried out through a channel for which the evaluated parameter does not exceed a predefined threshold.

5. The method as claimed claim 1, further comprising: evaluating, in the course of which at least one speed value representative of a mobility of one of the transceivers is computed, if the frequencies included in the second frequency interval are higher than those included in the first frequency interval, an operating frequency selected from the first frequency interval will be allocated in the course of the frequency selection if the computed speed value exceeds a predefined threshold.

6. The method as claimed in claim 1, wherein in a cellular telecommunication system including at least two neighbouring radio base stations and in which the frequencies included in the second frequency interval are higher than those included in the first frequency interval, the method further comprising:

channel monitoring to be carried out by the mobile terminal and in the course of which said mobile terminal analyses if channel conditions related to frequencies included in the first and second frequency intervals are suitable for said frequencies to be selected as operating frequencies for communicating with its current active base station; and switching a base station in the course of which the mobile terminal will require its active base station to be changed if no frequency included in the second frequency interval has been found suitable during the channel monitoring.

7. The method as claimed in claim 1 wherein allocating is performed by prioritarily allocating frequencies selected from the second frequency interval if the frequencies included in the second frequency interval are higher than those included in the first frequency interval.

8. The method as claimed in claim 1 wherein the channel condition reporting and the frequency allocating are repeatedly executed during a same communication established between a given mobile terminal and the radio base station.

9. The method as claimed in claim 1, wherein the second frequency interval includes frequencies having values corresponding to sub-millimeter wavelengths.

10. The method as claimed in claim 1, wherein the first or second frequency intervals feature respective first and second bandwidths which are different from each other.

11. A telecommunication system including at least two transceivers comprising means adapted to be linked together by a communication channel through which information is to be carried by means of at least one carrying signal having an operating frequency, the system comprising:

frequency selection means for dynamically selecting the operating frequency among frequencies comprised within at least two non-adjacent frequency intervals, wherein the same transmission scheme is used for transmitting signals at operating frequencies selected from the frequency intervals, the system being included in a cellular telecommunication system including at least one radio base station and at least one mobile terminal, the system further including reporting means included in the at least one mobile terminal for reporting of channel conditions of the two frequency intervals by transmitting at least one report signal, wherein the telecommunication system includes at least three transceivers, one transceiver being a base station and the other transceivers being mobile terminals, the system further comprising:

channel monitoring means included in each mobile terminal for enabling said mobile terminal to analyze if frequencies included in the frequency intervals are suitable for being selected as operating frequencies for communicating with its current active base station;

channel condition reporting means included in each mobile terminal for enabling said mobile terminal to report to the base station the findings of the analysis performed by the channel monitoring means;

frequency allocation means included in the radio base station for allocating one of the available frequencies to each mobile terminal for communicating with the radio base station; and operating frequency switching means for switching the operating frequency from a formerly selected frequency to a newly selected frequency, such a switching being performed gradually by simultaneously attenuating progressively the signal transmitted at the formerly selected frequency and amplifying progressively the signal transmitted at the newly selected frequency.

12. A method for transmitting information between at least two transceivers linked together by a communication channel, said information being carried by means of at least one carrying signal having an operating frequency, the method comprising:
computing at least one speed value representative of a mobility of one of the transceivers;
dynamically selecting an operating frequency among frequencies comprised within at least a first and a second non-adjacent frequency intervals using the computed speed value; and
operating frequency switching in the course of which the operating frequency is to be switched from a formerly selected frequency to a newly selected frequency, such a switching being performed gradually by simultaneously attenuating progressively the signal transmitted at the formerly selected frequency and amplifying progressively the signal transmitted at the newly selected frequency.

13. The method as claimed in claim 12, further comprising:
separating the first frequency interval from the second frequency interval by a separation interval having a width, called separation width, chosen such that a ratio between the separation width and the width of the first frequency interval exceeds a predetermined threshold.

14. The method as claimed in claim 12, further comprising:
allocating if the frequencies included in the second frequency interval are higher than those included in the first frequency interval, an operating frequency selected from the first frequency interval in the course of the frequency selection to a communication identified as requiring a predefined high quality of service.

15. The method as claimed in claim 12, further comprising:
a communication conditions evaluating in the course of which at least one parameter representative of the communication conditions affecting the communication channel is evaluated, wherein
if the frequencies included in the second frequency interval are higher than those included in the first frequency interval, an operating frequency selected from the first frequency interval will be allocated in the course of the frequency selection to a communication to be carried out through a channel for which the evaluated parameter does not exceed a predefined threshold.

16. The method as claimed in claim 12, wherein, if the frequencies included in the second frequency interval are higher than those included in the first frequency interval, an operating frequency selected from the first frequency interval will be allocated in the course of the frequency selection if the computed speed value exceeds a predefined threshold.

17. The method as claimed in claim 12, wherein a same transmission scheme is used for transmitting signals at operating frequencies selected from the first and second frequency intervals.

18. The method as claimed in claim 12, wherein in a cellular telecommunication system including at least two neighbouring radio base stations and at least one mobile terminal and in which the frequencies included in the second frequency interval are higher than those included in the first frequency interval, the method further comprising:
channel monitoring to be carried out by the mobile terminal and in the course of which said mobile terminal analyzes if channel conditions related to frequencies included in the first and second frequency intervals are suitable for said frequencies to be selected as operating frequencies for communicating with its current active base station; and
switching a base station in the course of which the mobile terminal will require its active base station to be changed if no frequency included in the second frequency interval has been found suitable during the channel monitoring.

19. A method for transmitting information between at least two transceivers linked together by a communication channel, said information being carried by means of at least one carrying signal having an operating frequency, the method comprising:
transmitting simultaneously information signals in the at least two discontinuous frequency bands; and
switching the operating frequency in the course of which the operating frequency is to be switched from a formerly selected frequency to a newly selected frequency, such a switching being performed gradually by simultaneously attenuating progressively the signal transmitted at the formerly selected frequency and amplifying progressively the signal transmitted at the newly selected frequency.

20. The method as claimed in claim 19, wherein a cellular telecommunication system includes at least one radio base station and mobile terminals, the method further comprising:
channel monitoring to be carried out by the mobile terminals and in the course of which each mobile terminal analyzes if frequencies included in the first and second frequency intervals are suitable for being selected as operating frequencies for communicating with its current active base station; and
channel condition reporting in the course of which each mobile terminal reports to the base station the findings of the channel monitoring it has performed.

* * * * *